(12) United States Patent
Murasaki et al.

(10) Patent No.: US 6,330,009 B1
(45) Date of Patent: *Dec. 11, 2001

(54) SCROLL CONTROLLER

(75) Inventors: Yasushi Murasaki, Soraku-gun; Toshio Isoe, Tenri, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,394

(22) Filed: Nov. 24, 1998

(30) Foreign Application Priority Data

Nov. 25, 1997 (JP) .................................................. 9-322711

(51) Int. Cl.[7] ...................................................... G06F 9/00
(52) U.S. Cl. ........................................... 345/784; 345/115
(58) Field of Search .................................. 345/123, 124, 345/125, 115, 339, 340, 341, 342, 343, 346, 764, 781, 784, 788, 803, 804

(56) References Cited

U.S. PATENT DOCUMENTS

| | | | |
|---|---|---|---|
| 5,331,335 | | 7/1994 | Iida . |
| 5,533,182 | * | 7/1996 | Bates et al. ........................ 345/341 |
| 5,854,629 | * | 12/1998 | Redpath ............................ 345/341 |
| 5,864,330 | * | 1/1999 | Haynes ............................. 345/123 |
| 5,872,566 | * | 2/1999 | Bates et al. ........................ 345/341 |
| 5,936,623 | * | 8/1999 | Amro ............................... 345/348 |
| 6,072,461 | * | 6/2000 | Haran .............................. 345/115 |

FOREIGN PATENT DOCUMENTS

| | | | |
|---|---|---|---|
| 0 469 923 A2 | 2/1992 | (EP) . | |
| 0 474 234 A2 | 3/1992 | (EP) . | |
| 0 762 264 A1 | 3/1997 | (EP) . | |
| 96113462.4 | * 3/1997 | (EP) ............................. | G06F/3/033 |
| 2 744 551 A1 | 8/1997 | (FR) . | |
| 9-69037 A | 3/1997 | (JP) . | |
| 96/31819 | 10/1996 | (WO) . | |
| 97/37294 | 10/1997 | (WO) . | |

OTHER PUBLICATIONS

Patent Abstracts of Japan, vol. 095, No. 010, Nov. 30, 1995 & JP 07 175624 A (Mitsubishi Electric Corp), Jul. 14, 1995.
Patent Abstracts of Japan, vol. 097, No. 009, Sep. 30, 1997 & JP 09 128132 A (Sharp Corp), May 16, 1997.

* cited by examiner

*Primary Examiner*—Cao H. Nguyen
(74) *Attorney, Agent, or Firm*—Nixon & Vanderhye P.C.

(57) ABSTRACT

There is provided a scroll controller which solves a problem that in scrolling an image at coordinates specified by a pen or the like to specific coordinates (e.g., the center), it is unable in a display such as a liquid crystal display having a slow display reaction speed to grasp the state of movement when a scroll quantity (scroll speed) per unit time is fast. The scroll controller calculates a difference between prefixed coordinates and the coordinate position specified by a position specifying device and on the basis of the calculation result, controls so that not only stepwise scroll quantities are obtained, but also scroll quantities in starting and ending of the scroll are different from that in the other time of the scroll.

10 Claims, 15 Drawing Sheets

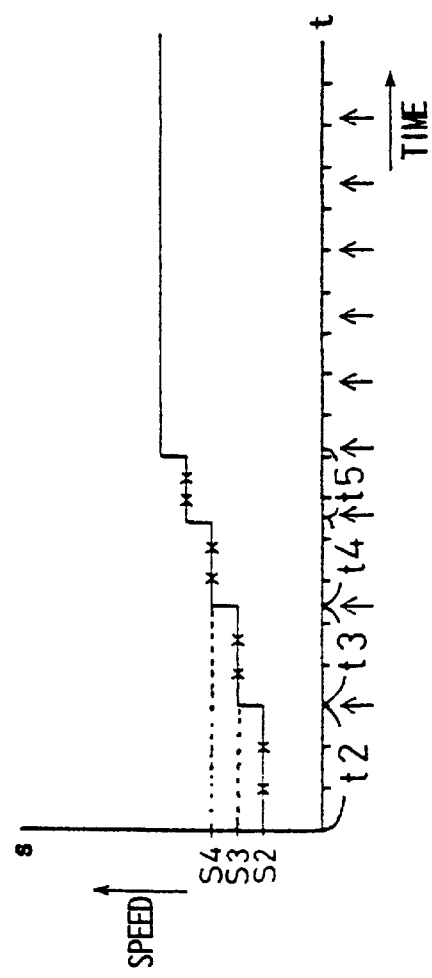
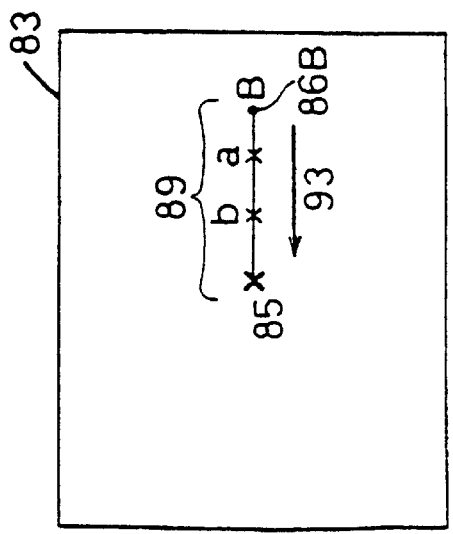

SCROLL CONTROLLER

BACKGROUND OF THE INVENTION

1. Field of the Invention

The present invention relates to a scroll controller capable of converting data into an image which can be visually displayed and visually displaying the image, which scroll controller may be suitably embodied in personal computers and small electronic apparatuses.

2. Description of the Related Art

Hitherto, as a so-called scroll control in a small electronic apparatus, there has been a technology of conducting a scroll operation by setting a moving direction and a moving quantity by points as described in Japanese Unexamined Patent Publication JP-A 9-69037 (1997) for example.

FIGS. 13A and 13B are a diagrammatic view and a graph for explaining the related art scroll operation. An outer frame 83 in FIG. 13A denotes an edge of a scroll area of a display screen of a display device, i.e., a visual display area where an image scroll operation is carried out.

A reference point 85 is set at the center of the scroll area. A specified point 130 is a point within the scroll area corresponding to a point which has been inputted and specified by an user of the electronic apparatus through a coordinate input device.

When the specified point 130 is specified, a central processing unit scrolls a part of data image displayed on the display screen of the display device so that an image displayed at the position of the specified point 130 is displayed at the position of the reference point 85 via six relay points 131.

That is, the image which has been displayed right under the point where the user has pressed the coordinate input device 13 is scrolled so as to be positioned at the center of the display device 12 step by step. The scroll is performed so as to switch images for example in this prior art example.

A moving quantity of one step in scrolling the image is specified to be equal to a distance obtained by dividing the distance between the reference point 85 and the specified point 130 into seven equal parts for example. The image is switched and scrolled by 1/7 of the distance between the reference point 85 and the specified point 130 in the first step and then it is scrolled to the position of 2/7 of the distance between the reference point 85 and the specified point 130 in the second step. The image which has been displayed at the position of the specified point 130 is displayed at the position of the reference point 85 by repeating the above-mentioned procedure by seven times. Accordingly, the greater the distance between the reference point 85 and the specified point 130, the greater the distance of one step where the image is scrolled becomes.

The image is scrolled in the direction from the specified point 130 to the reference point 85 in the scroll operation of this prior art example. That is, when the point 130 is specified, the image is scrolled in the direction indicated by a vector 132, i.e., in the upper left direction, in this prior art example.

FIG. 13B is a graph showing the relationship between a time and a speed in scrolling the image of this case. Assuming a time required for scrolling from the specified point 130 to the relay point 131a is t10 and the speed from the specified point 130 to the relay point 131a is s10, the moving distance of one step may be represented as "t10× s10".

The moving distance between the respective remaining points may be represented as "t10×s10" in the same manner and the moving speed in each unit time from the specified point 130 to the reference point 85 is constant. Thus, the electronic apparatus 11 of this prior art example can scroll the image stepwise in any direction.

However, the above-mentioned prior art technology has had a problem that because the scroll speed is all the same, it confuses the user because the image moves quickly to the specified position and the moving directionality cannot be get when a display device such as a liquid crystal display whose display processing speed is low is used.

Further, the related art technology has another problem that it becomes difficult to confirm a scroll quantity as the scroll speed increases and that the scroll had to be released in order to confirm the scroll quantity.

SUMMARY OF THE INVENTION

Hence, a primary object of the invention is to provide a scroll controller capable of scrolling an image in an arbitrary direction when a pen is touched to an image and immediately separated therefrom, and starting and ending a scroll of an image with different scroll quantities from that of the other time of the scroll.

Another object of the present invention is to provide a scroll controller capable of confirming a scroll quantity by changing an image moving speed in accordance to a moving distance of a tip of the pen when the tip of the pen is continuously touched to an image and by informing that an image at specified coordinates has been scrolled to a fixed coordinate position.

The invention provides a scroll controller comprising a storage device for storing image information; a display device for displaying the image information stored in the memory device; a position specifying device for specifying the coordinate position of the image information displayed on the display device; a calculating device for calculating a difference between prefixed coordinates and the coordinate position specified by the position specifying device; a scroll quantity setting device for setting a scroll quantity per unit time on the basis of a calculation result of the calculating device; and a scroll control device for scrolling the image information on the basis of the scroll quantity set by the scroll quantity setting device.

In the invention it is preferable that the scroll quantity setting device sets scrolling quantities so that a scroll starts and ends with different scrolling quantities from that of the other time of the scroll.

In the invention it is preferable that when a plurality of scroll operations by the scroll control device are carried out consecutively, the scroll quantity setting device increments a scroll quantity per unit time operation by operation.

As mentioned above, according to the invention, the scroll controller comprises the position specifying device, e.g., a so-called tablet. Then, an operator is allowed to scroll an image in any direction by touching a pen to the tablet and immediately separating the pen therefrom. Further, since the scroll controller is arranged so as to start and end the scroll operation with different scroll quantities from that of the other time, the operator can readily recognize the moving directionality. Still more, since the scroll quantity per unit time increases when the scroll operation is consecutively carried out a plurality of times, the scroll operation of a long distance may be performed in a short time.

The invention provides a scroll controller comprising a storage device for storing image information; a display device for displaying the image information stored in the memory device; a position specifying device for specifying the coordinate position of the image information displayed on the display device; a calculating device for calculating a difference between prefixed coordinates and the coordinate position specified by the position specifying device; a scrolling device for scrolling the image information at the specified coordinate position to the fixed coordinate position based on the calculation result of the calculating device; and a notifying device for notifying at the point of time when the image at the specified coordinates is scrolled to the fixed coordinates by the scrolling device.

As mentioned above, according to the invention the scroll controller comprises the position specifying device, e.g., a so-called tablet. In the case that the operator continuously touches the pen to the tablet, when the image at the specified coordinates is scrolled to the fixed coordinate position, the scroll controller notifies that the scroll has carried out to the fixed coordinate position. Thereby, the operator can recognize the state of move, regardless whether it is large or small, by repeating the scroll operation and the notifying process during when the tablet is being touched by the pen.

BRIEF DESCRIPTION OF THE DRAWINGS

Other and further objects, features, and advantages of the invention will be more explicit from the following detailed description taken with reference to the drawings wherein:

FIGS. 9A and 9B are a diagrammatic view and a graph showing a scroll operation when a specified point is distant from a reference point in the second scroll control;

Figures 12, 12A, 12B:
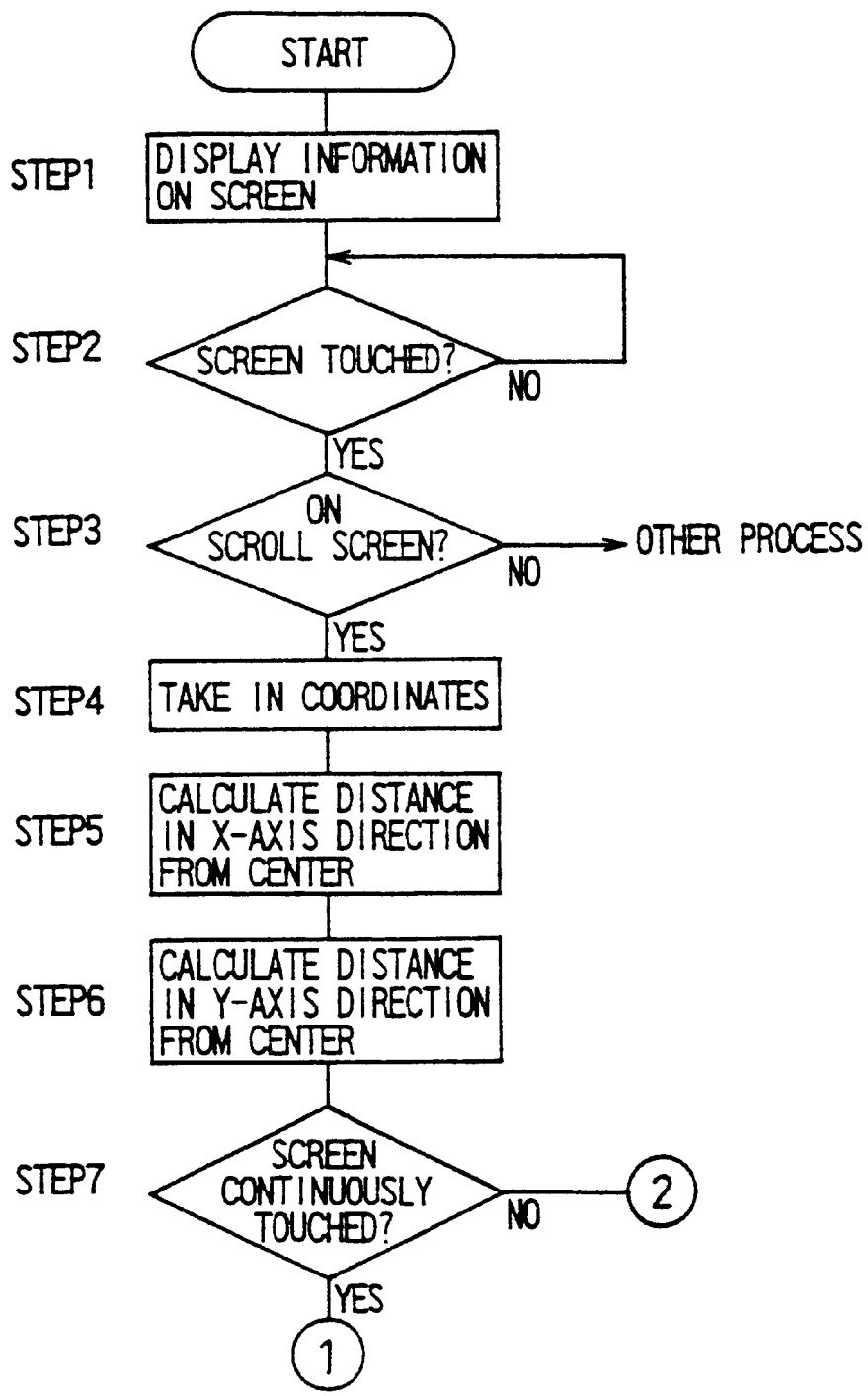
Figure 12B:
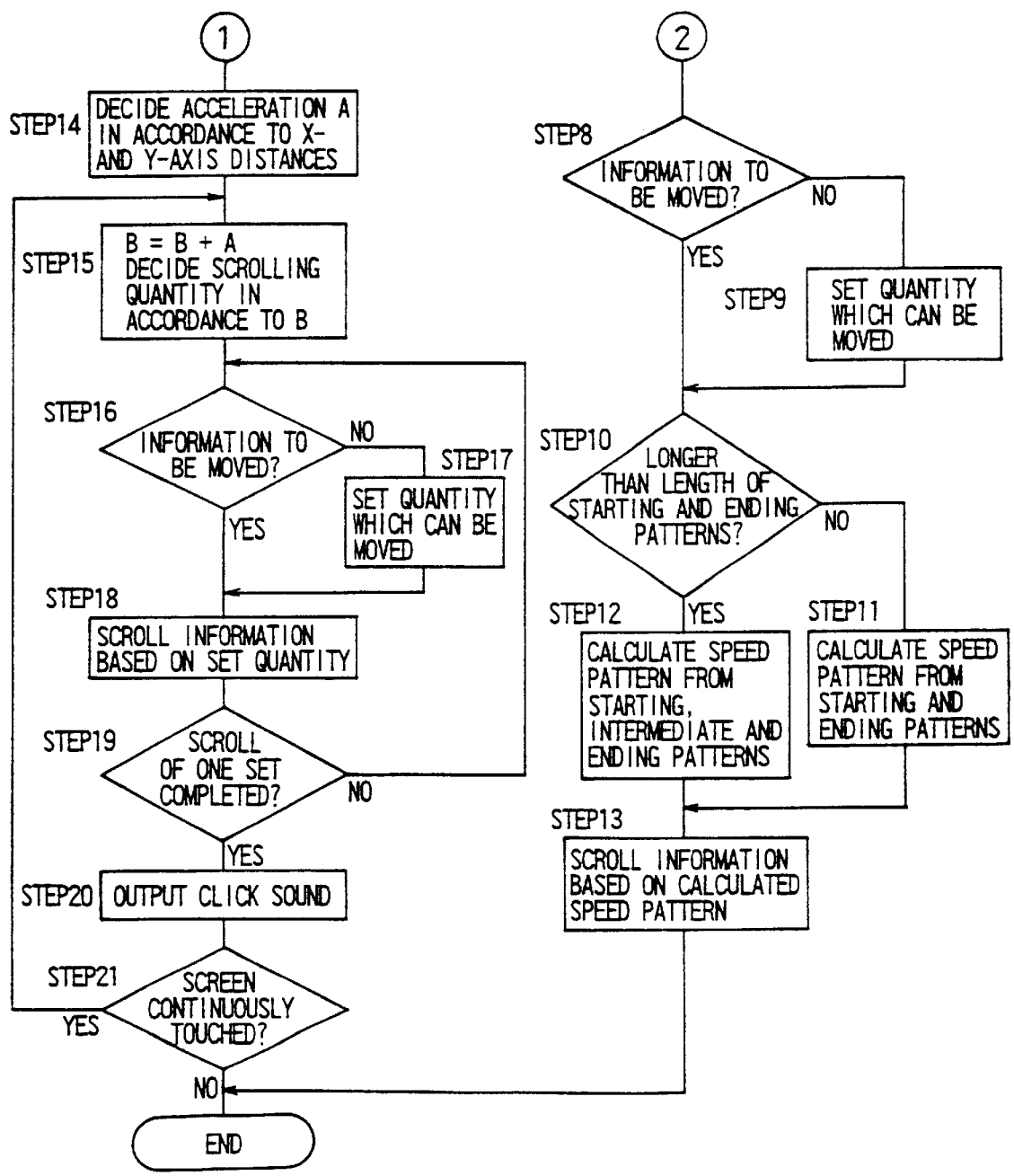

The FIGS. 12A and 12B are a flow chart showing the first and second scroll controls.

Figure 13B:
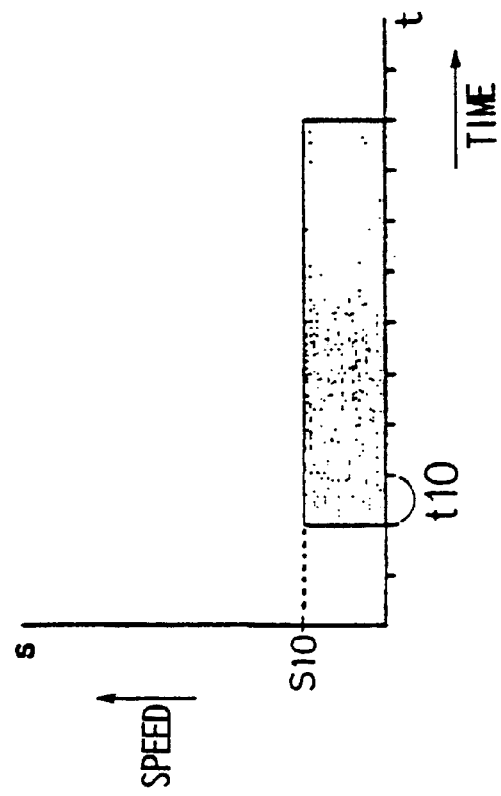
Figure 13A:
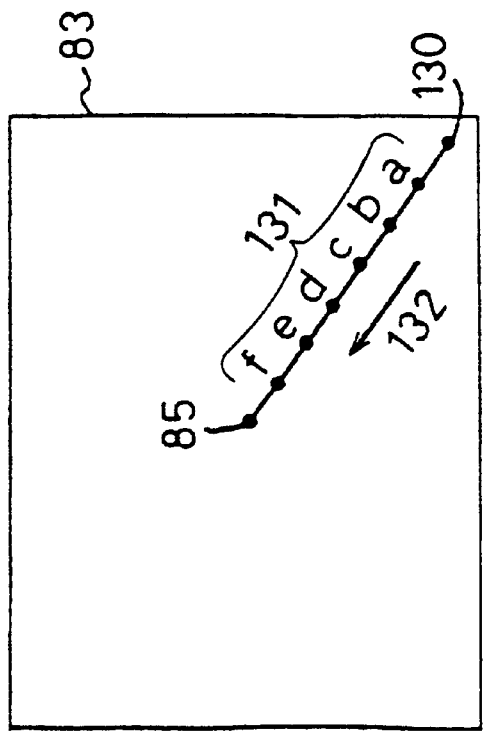

FIGS. 13A and 13B are a diagrammatic view and a graph showing a prior art scroll operation.

DETAILED DESCRIPTION OF THE PREFERRED EMBODIMENTS

Now referring to the drawings, preferred embodiments of the invention are described below.

The present invention will be explained below in detail based on preferred embodiments thereof shown in the appended drawings. It is noted that the present invention is not confined to those embodiments.

Figure 1:
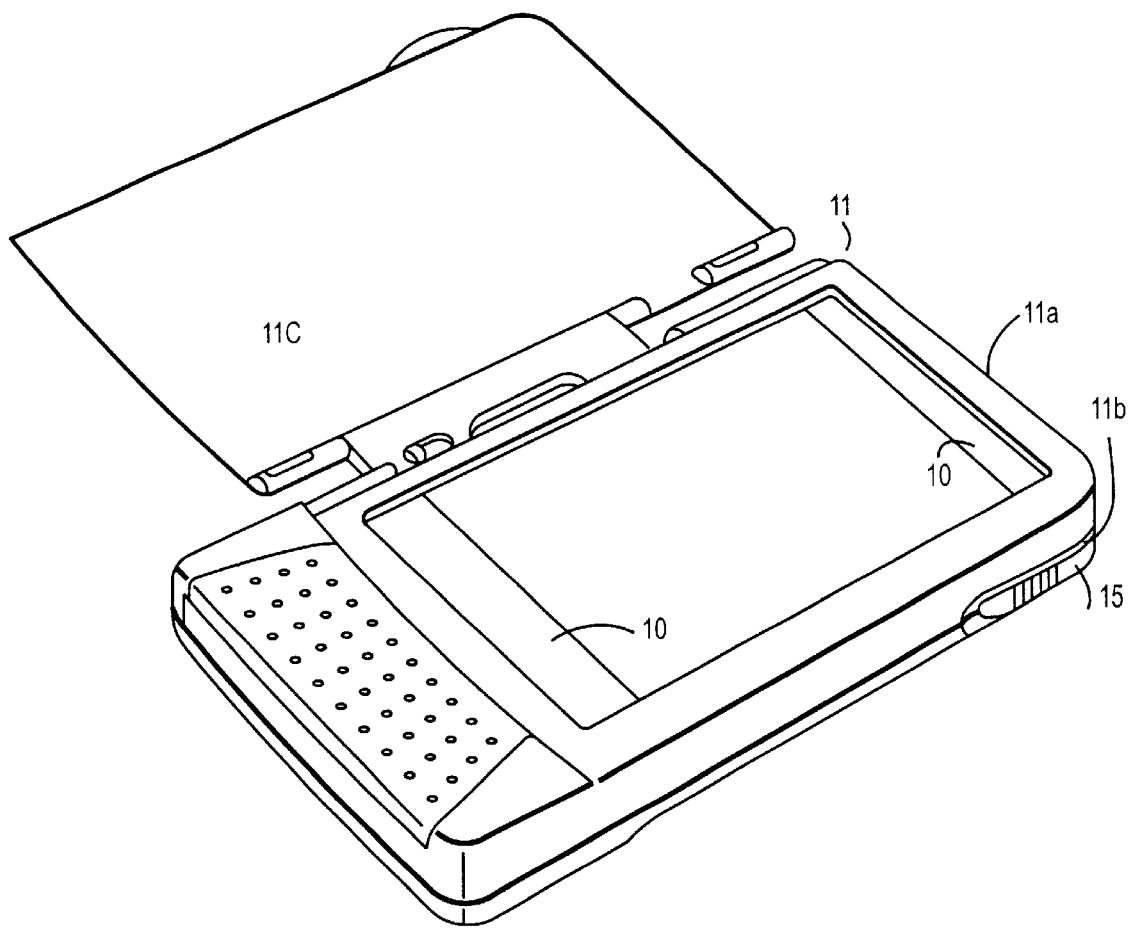
FIG. 1 is a perspective view showing an appearance of an electronic apparatus equipped with a scroll controller of the present invention.

FIG. 1 is a perspective view showing an appearance of an electronic apparatus 11 equipped with a scroll controller of the invention. The electronic apparatus 11 is an apparatus so-called a personal digital assistant or an electronic pocketbook having functions of managing telephone numbers and schedules and of storing and editing inputted character strings.

The electronic apparatus 11 comprises a display device 12 and a coordinate input device 13. The display device 12 may be realized by a liquid crystal display for example. The coordinate input device 13 is transparent and is disposed in contact on a display screen of the display device 12.

The coordinate input device 13 detects two-dimensional coordinates of a point where a user touches the surface of the coordinate input device 13 by a finger or a pen 15. The coordinate input device 13 is realized by a touch panel called a tablet. While there are various types of touch panels such as a resistance film type, an electrostatic capacity type, an optical type and an ultrasonic type touch panel in general, any type of touch panel may be used as the coordinate inputting section of the embodiments of the invention.

Here, the structure of the resistance film type touch panel will be explained below. The resistance film type touch panel has two transparent electrode members formed by molding a transparent conductor thin film on a transparent glass or film. The touch panel is constructed by disposing the transparent electrode members so that the faces on which the conductor thin films are formed face to each other and by creating an insulating dot spacer on the face of one transparent electrode member on which the conductor thin film is formed to prevent the two transparent electrode members from contacting each other. When one point of such touch panel is pressed, the conductor thin films of the two transparent electrode members short. The pressed position may be detected by utilizing this short-circuit.

Fixed keys 10 displayed on the both ends of the display device 12 are what frequently used fixed functions are displayed and printed by comprehensible marks on a film inserted between the coordinate input device 13 and the display device 12.

The power source of the electronic apparatus 11 may be turned ON by touching the coordinate input device 13 in the state when it is off. A pen storage section 11b for storing the pen 15 for inputting coordinates on the coordinate input device 13 is provided on the side of a case 11l of the electronic apparatus 11. A lid 11c connected to the case 11l by a hinge is provided on the back of the case 11l of the electronic apparatus 11. The lid 11c turns so as to cover the display device 12 and the coordinate input device 13, so that it plays a role of protecting the display device 12 and the coordinate input device 13 in carrying the electronic apparatus 11.

Figure 2:
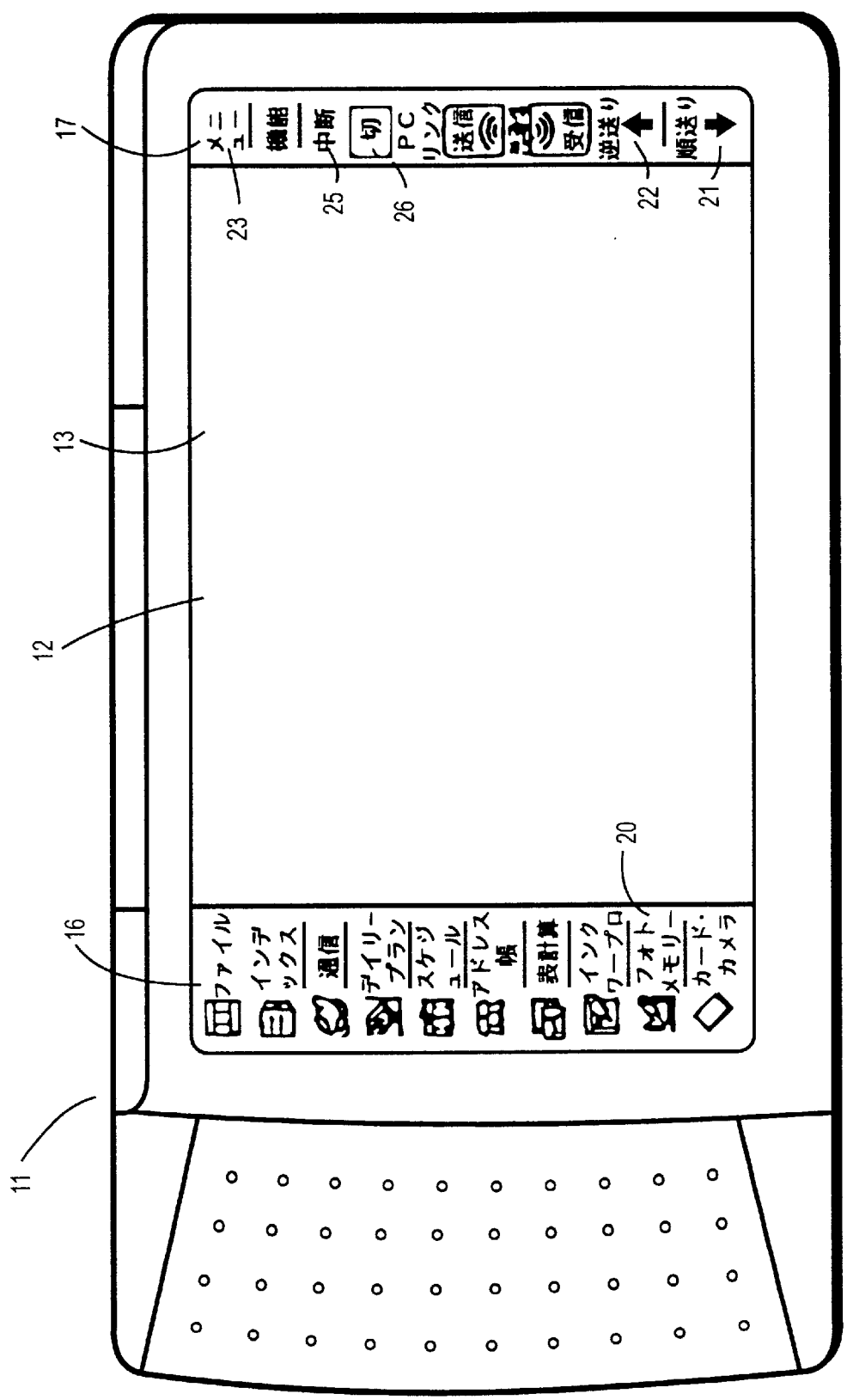
FIG. 2 is a front view of the electronic apparatus in FIG. 1.

FIG. 2 is a front view of the electronic apparatus 11 shown in FIG. 1. The electronic apparatus 11 has a mode key group 16 and a function key group 17. The mode key group 16 and the function key group 17 are the fixed keys 10 shown in FIG. 1.

The mode key group 16 is a group of keys for switching and running functions which can be carried out by the electronic apparatus 11, such as the function for managing a telephone numbers and schedules and the function for inputting and editing character strings.

The mode key group 16 includes a data processing mode key 20 which is a key for imaging, displaying and editing data.

The function key group 17 is a group of keys for specifying an operation which can be executed in the state where a function selected by keying a key of the mode key group 16 is being run. The function key group 17 includes a feed forward key 21 and a feed backward key 22 which are instruction keys for switching data displayed within the display device 12 to other data, a menu key 23 which is an instruction key for displaying a menu screen for selecting and executing a plurality of processing functions, an interrupt key 25 which is an instruction key for interrupting a process being run, and a disconnect key 26 which is a key for turning off the power source of the electronic apparatus 11.

Figure 3:
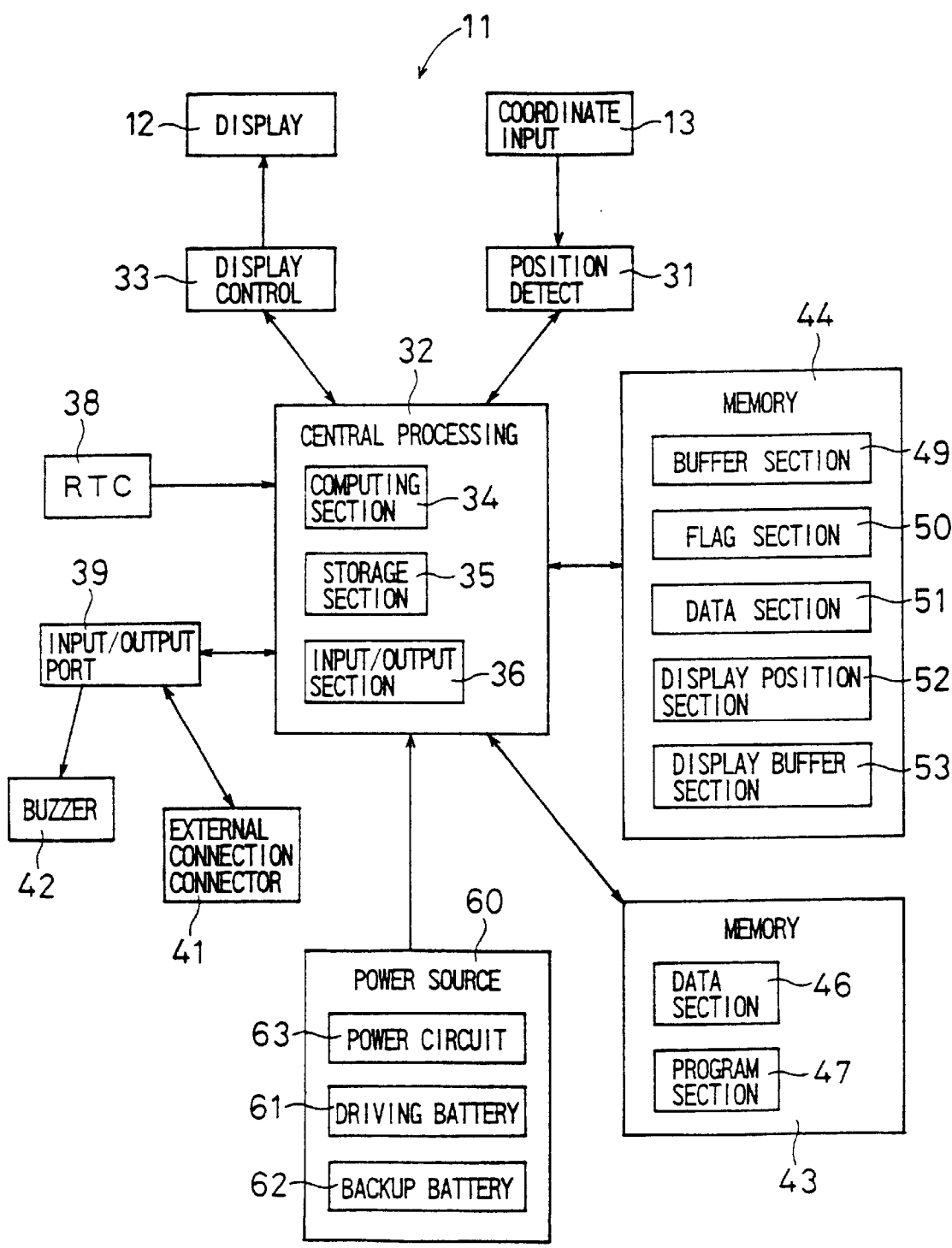
FIG. 3 is a block diagram showing the electrical structure of the scroll controller in FIG. 1.

FIG. 3 is a block diagram showing the electrical structure of the scroll controller 11 shown in FIG. 1. The electronic apparatus 11 comprises the display device 12, the coordinate input device 13, a position detecting section 31, a central processing unit 32, a display control section 33, an RTC 38, an input/output port 39, an external connection connector 41, a buzzer 42, memories 43 and 44 and a power source 60.

When the user manipulates the coordinate input device 13 by pressing it for example, the position detecting section 31 detects coordinates of the position where the coordinate input device 13 is manipulated and outputs positional information to the central processing unit 32.

The central processing unit 32 outputs data for displaying a display image on the display device 12 to the display control section 33. The display control section 33 controls the display device 12 in accordance to the output given from the central processing unit 32.

The central processing unit 32 comprises a computing section 34, a storage section 35 and an input/output section 36. The computing section 34 performs arithmetic operations based on the output given to the central processing unit 32. The storage section 35 includes an internal memory and registers for storing the data used in the arithmetic operation performed in the computing section 34 and the computed results.

The input/output section 36 includes an input/output port and a buffer for receiving the output given to the central processing unit 32. The input/output port 39 exchanges data between another electronic apparatus connected via an external connector 41 and the central processing unit 32 of the electronic apparatus 11. The input/output port 39 also controls the buzzer 42 provided in the electronic apparatus 11 in accordance with the output from the central processing unit 32.

The central processing unit 32 reads data stored in the memories 43 and 44. The memory 43 comprises a data section 46 and a program section 47. Font data and graphic data for displaying characters on the display device 12 and the other data such as a translation dictionary for translating hiragana characters inputted to input Japanese into kanji characters are stored in the data section 46. The "character" is a concept including hiragana characters, katakana characters, kanji characters, alphabets, numerals, symbols, icons and the like. A character string is an aggregate of a plurality of characters.

A program for implementing processes of the function corresponding to each key of the above-mentioned mode key group 16, a program for controlling the operation of the electronic apparatus 11 and the like are stored in the program section 47. The memory 43 may be realized by a read only memory for example.

The memory 44 comprises a buffer section 49, a flag section 50, a data section 51, a display position section 52 and a display buffer section 53 and stores the output from the central processing unit 32. The memory 44 may be realized by a random access memory.

The buffer section 49 is used to store data temporarily in executing the program in the program section 47 of the memory 43. Similarly to that, flags used in executing the program in the program section 47 of the memory 43 are stored in the flag section 50. Data to be visually displayed on the display device 12 is stored in the data section 51 while having being developed into the mode which can be displayed on the display screen of the display device 12.

Data indicative of that image data to be displayed on the display screen of the display device 12 as a display image belongs to which part of the data stored in the data section 51 is stored in the display position section 52. The image data of the display image to be visually displayed on the display screen of the display device 12 is stored in the display buffer section 53.

Electric power is supplied from the power source 60 to the central processing unit 32. The power source 60 is provided with a driving battery 61, a backup battery 62 and a power circuit 63. The driving battery 61 drives the whole electronic apparatus 11. The backup battery 62 holds the contents stored in the memory 44 and the storage section 35 of the central processing unit 32. The power circuit 63 performs a low battery check to detect exhaustion of the batteries 61 and 62.

Figure 4:
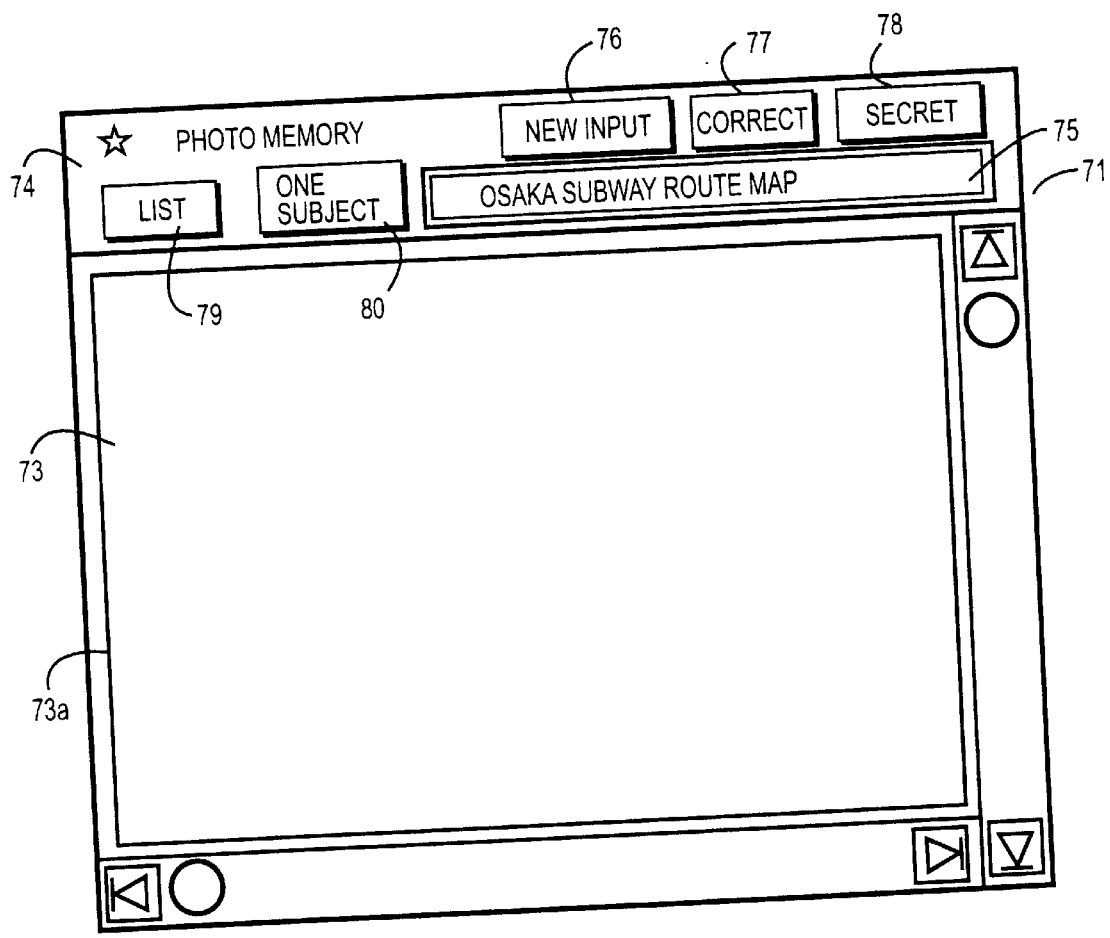
FIG. 4 shows a display image displayed on a display device.

FIG. 4 shows a display image 71 displayed on the display device 12. When the user manipulates the data processing mode key 20 in the mode key group 16, the inventive electronic apparatus 11 images part of data stored in the data section 51 of the memory 44 and visually displays on the display device 12 as shown in FIG. 4.

The display image 71 is composed of a data display part 73 and a command display part 74. The data display part 73 is a part for displaying an image which has been imaged to visually display part of the data stored in the data section 51.

The command display part 74 is a part for clearly expressing for the user that a data processing function is being implemented and for displaying images of buttons used in the processing function. For instance, "PHOTO MEMORY" is a comment indicative of that the data processing operation is being executed and does not change until when the data processing operation ends.

Part 75 shows a title of data presently displayed. "NEW INPUT", "CORRECT", "SECRET", "LIST", and "ONE SUBJECT" are images of buttons 76 through 80 for instructing processing operations to be implemented in the respective data processing functions.

In the electronic apparatus 11 of the present embodiment, the buttons are constructed by combining the image drawn on the display screen of the display device and the coordinate input device 13 positioned right above the image when it is displayed. That is, it is determined that each button is manipulated and a processing operation corresponding to that button is executed when coordinates inputted by the coordinate input device 13 specify the position corresponding to the position where each button within the image is drawn. So to speak, it is equivalent to that a partial area of the coordinate input device 13 sectioned by the image displayed on the display device 12 is used as an input device. When the coordinates of the sectional area are detected, a function represented by the image displayed on the display device 12 right under the sectional area is executed.

Further, the original disposition of each button of the input device set by combining the display device 12 and the coordinate input device 13 may be readily changed just by changing a program which causes an inputted image to correspond with the display image. Accordingly, the display screen of the display device may be used in maximum by using the above-mentioned buttons as the input device in the electronic apparatus such as a small portable information terminal whose size is limited.

Part of data stored in the data part 51 is imaged and displayed on the data display part 73. The data stored in the data section 51 is imaged in correspondence to an imaginary display area which is larger than the data display part 73. The image displayed in the data display part 73 is an image formed by cutting out a part of the imaginary image. Accordingly, there exists image corresponding to the data not displayed on the display device 12 at the periphery of four sides of the image in the data display part 73. A scroll operation is carried out to display the image of the data not displayed at the center of the data display part 73 at the center by specifying a point within the display screen corresponding to the data display part 73 in the present embodiment.

The operation will be explained below with regard to first scroll control with reference to FIGS. 3 through 8. FIGS. 5A through 5H show changes of images to be displayed by the scroll operation. An outer frame 83 in FIGS. 5A through 5H corresponds to a boundary line 73a of the area of the data display part 73 in FIG. 4 and denotes an edge of a scroll area 84 of the display screen of the display device 12 which is a visual display area where the image scroll operation is carried out.

The display images shown in FIGS. 5A through 5H are displayed sequentially in this order. All of the two consecutive display images are displayed at equal time intervals. A graphic 80 containing "日本橋" positioned at the lower right part of a route map in FIG. 5A may be moved to the center by touching the graphic 80 by the pen 15 and then by separating it. The image at the touched position is started to be scrolled to the center by this manipulation.

Figure 5A:
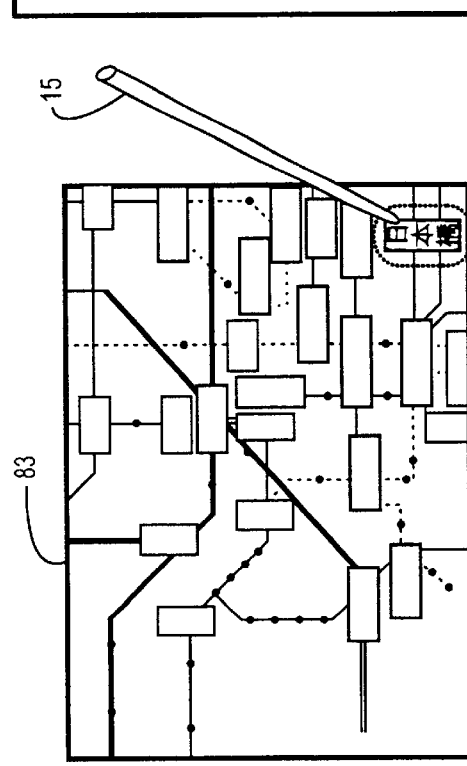
FIGS. 5A through 5H show display images displayed by scroll operations in a first scroll control.
Figure 5B:
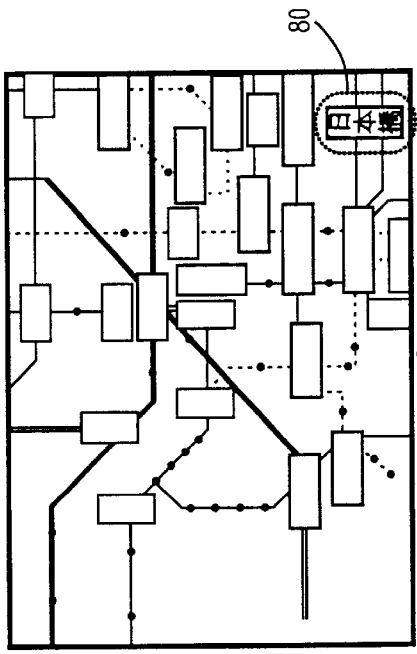

That is, when the user touches the graphic 80 by the pen as shown in FIG. 5A, "日本橋" is scrolled in the direction of the center of the scroll area 84 slightly as shown in FIG. 5B. The graphic 80 is scrolled further in the direction of the center of the scroll area 84 slightly as shown in FIG. 5C.

Figure 5C:
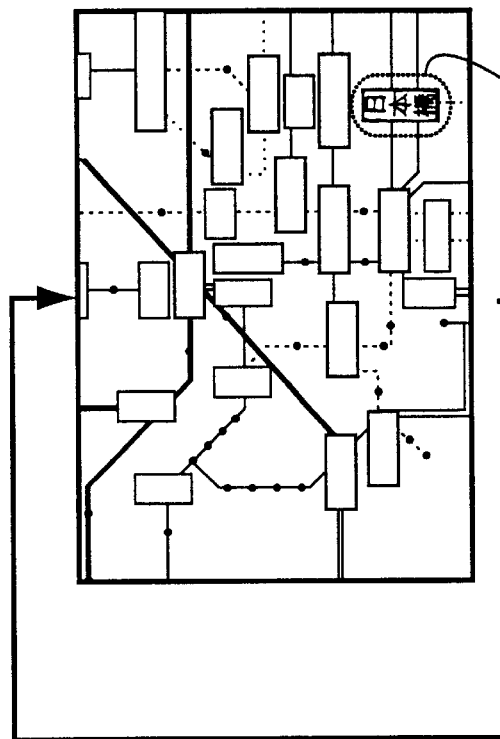
Figure 5D:
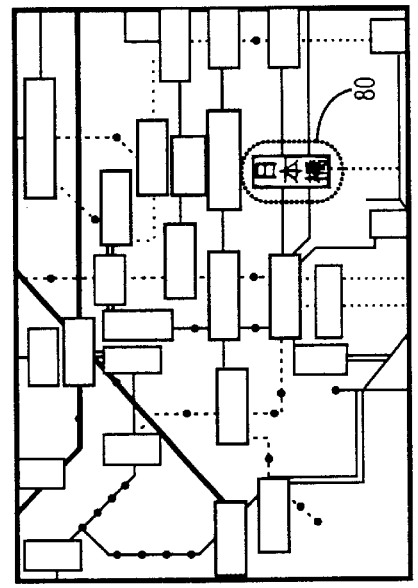

Then, as shown in FIG. 5D, it is scrolled in the direction of the center largely as compared to the distances between those in FIGS. 5A and 5B and in FIGS. 5B and 5C. It is scrolled to the state in FIG. 5F with the same rate.

Figure 5G:
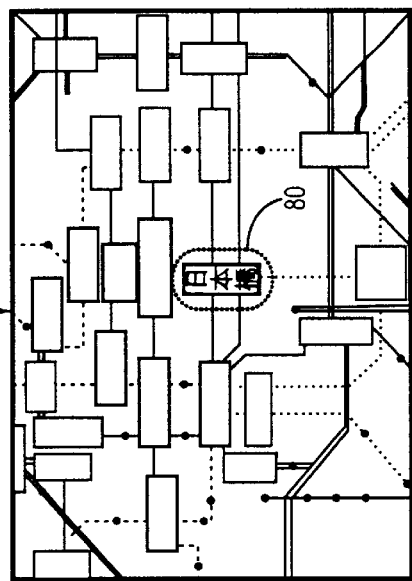
Figure 5H:
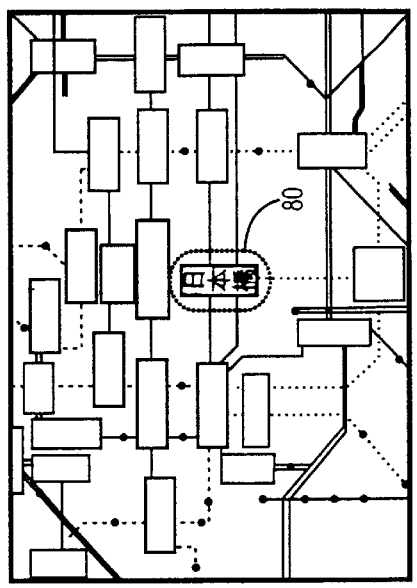
Figure 5E:
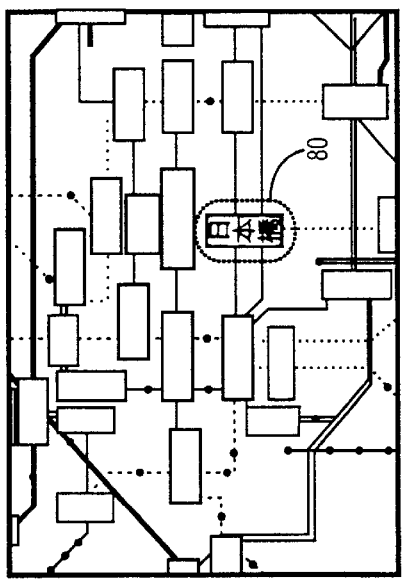
Figure 5F:
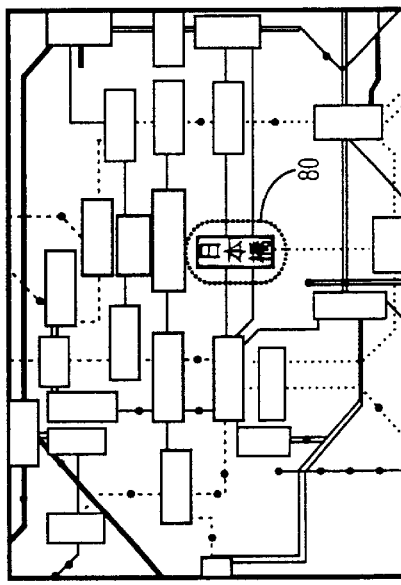

It is scrolled in the direction of the center slightly between the states in FIGS. 5F and 5G and FIGS. 5G and 5H similarly to those between FIGS. 5A and 5B and FIGS. 5B and 5C. The scroll operation ends when the graphic 80 is positioned at the center of the scroll area 84 as shown in FIG. 5H.

The fore-going scroll operation will be explained below in detail with reference to FIGS. 6 through 8. FIG. 6A is a diagrammatic view for explaining the scroll operation in the first embodiment.

An outer frame 83 in FIG. 6A corresponds to the boundary line 73a of the area of the data display part 73 in FIG. 4 and denotes an edge of the scroll area 84 of the display screen of the display device 12 which is a visual display area where the image scroll operation is carried out.

A reference point 85 is set in the scroll area 84. While the reference point 85 may be set at any position within the scroll area 84, assume here that the reference point 85 is set at the center of the scroll area 84. A specified point 86 is a point within the scroll area 84 corresponding to the point inputted and specified by the user of the electronic apparatus 11 via the coordinate input device 13.

When the user presses one point of the coordinate input device 13 provided over the display screen of the display device 12 by the pen 15, the point on the display screen of the display device 12 right under the pressed point is specified as the specified point.

When the specified point 86 is specified, the central processing unit 32 scrolls the data display part displayed on the display screen of the display device 12 so that the image displayed at the position of the specified point 86 is displayed at the position of the reference point 85 via six relay points 88.

That is, the image displayed right under the point where the user has pressed the coordinate input device 13 is scrolled so as to be positioned at the center of the display device 12 step by step. The scroll is carried out so as to switch the images stepwise for example in the present embodiment.

The specified point 86 corresponds to the graphic 80 in FIG. 5A, each point of the relay points 88 corresponds to that in FIGS. 5B through 5G and the reference point 85 corresponds to that in FIG. 5H, respectively. The image is scrolled by switching the images so that the graphic 80 moves from the specified point 86 to the relay point 88a in the first step and is scrolled so that the graphic 80 moves from the relay point 88a to the relay point 88b in the second step. The image displayed at the position of the specified point 86 is displayed at the position of the reference point 85 by repeating this operation by seven steps.

The image is scrolled from the specified point 86 in the direction of the reference point 85 in the scroll operation of the present embodiment. That is, when the specified point 86 is specified, the image is scrolled in the direction indicated by a vector 92, i.e., in the upper left direction, in the present embodiment. However, the image may be scrolled not only in the direction of the vector 92 but also in any direction of up and down, right and left and oblique directions.

When a command is issued to scroll up, down, right or left in the case that an upper, lower, right or left edge of the original data is displayed, it may be scrolled only within an extent where the original data exists.

Figure 6B:
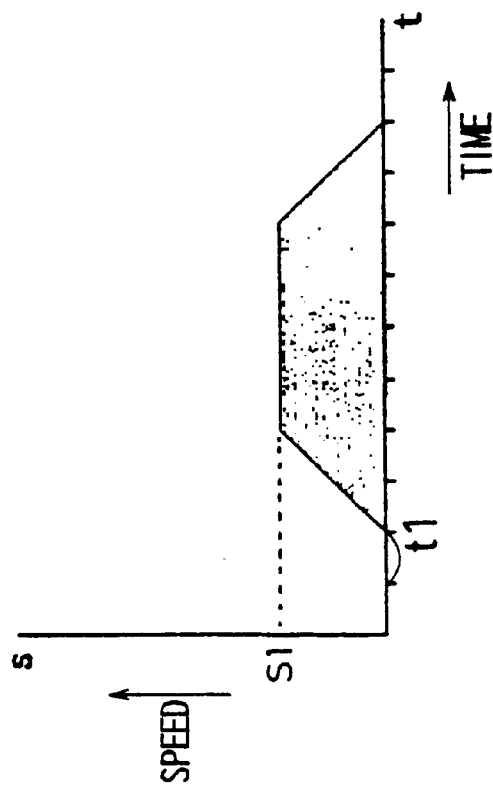
FIGS. 6A and 6B are a diagrammatic view and a graph showing changes of a display image by the scroll operation in the first scroll control.
Figure 6A:
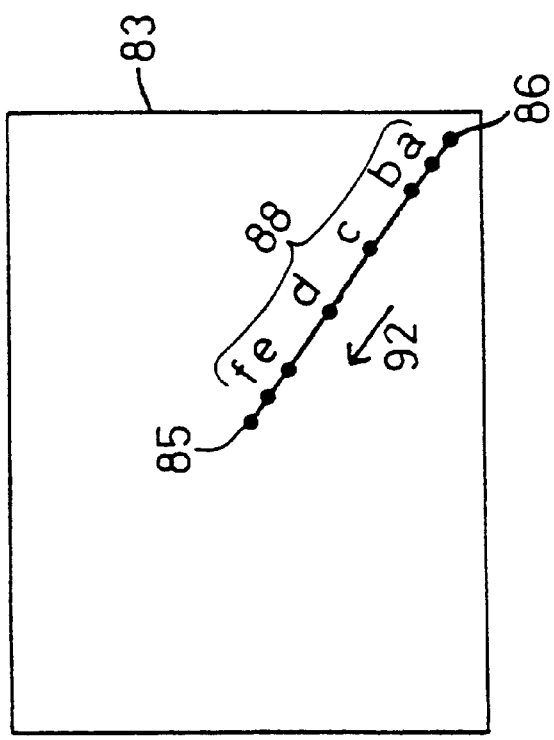

FIG. 6B is a graph showing the relationship between an image moving time and an image moving speed in scrolling the image as shown in FIGS. 5A through 5H. When it is assumed that a time required for moving from the specified point 86 to the relay point 88a is t1 and a speed per one step between the relay point 88b and the relay point 88f is s1, moving distances from the specified point 86 to the relay point 88a and from the relay point 88g to the reference point 85 may be represented as "$(t1 \times s1/2)/2 = (t1 \times s1)/4$", respectively, and moving distances from the relay point 88a to the relay point 88b and from the relay point 88f to the relay point 88g may be represented as "$(t1 \times s1) - (t1 \times s1)/4$", respectively, respectively.

A moving distance per step between the relay point 88b and the relay point 88f may be represented as "$t1 \times s1$". The moving speed from the specified point 86 to the relay point 88b is accelerated, the moving speed per unit time from the relay point 88b to the relay point 88f is constant and the moving speed from the relay point 88f to the reference point 85 is decelerated as shown in the figures.

Next, the relationship between the moving distance and the moving speed will be explained with reference to FIGS.

Figure 8A:
FIGS. 8A through 8D are diagrams showing patterns of moving quantity in moving an image in the first scroll control.

8A through 8D. FIG. 8A is a graph showing a pattern of a moving quantity for moving an image. The moving quantity is composed of a starting pattern, an intermediate pattern and an ending pattern as shown in FIG. 8A.

The starting pattern represents the pattern of moving quantity when the speed is accelerated, the intermediate pattern represents the pattern of moving quantity when the speed is held at a constant speed and the ending pattern represents the pattern of moving quantity when the speed is decelerated. When the specified point is specified, the moving quantity is set by combining the above-mentioned three patterns in accordance to a distance between the reference point and the specified point. The starting pattern and the ending pattern are used preferentially in combining the three patterns. In concrete, the combination of the three patterns is determined by the distance from the specified point to the reference point, i.e., the relationship of magnitude between the scroll moving quantity and the reference moving quantity set by combining the starting and ending patterns.

Figure 7B:
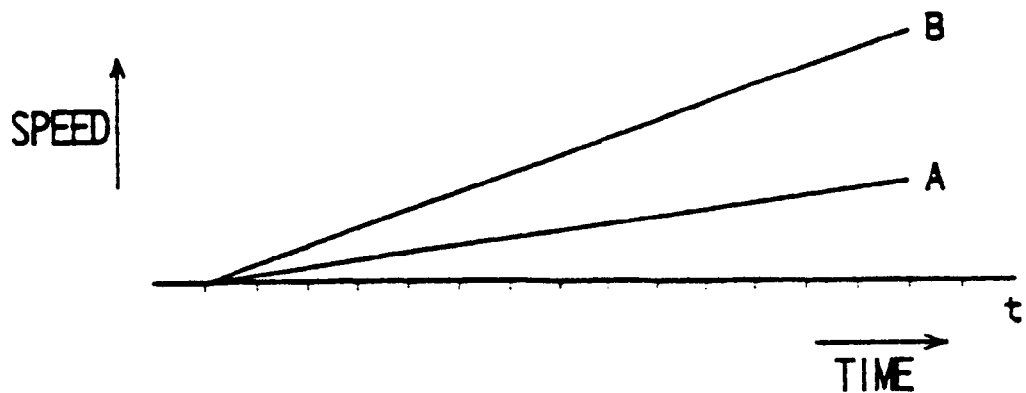
FIGS. 7A and 7B are a graph and a diagrammatic view showing a difference of moving speeds caused by a difference of moving distances in a second scroll control.
Figure 7A:
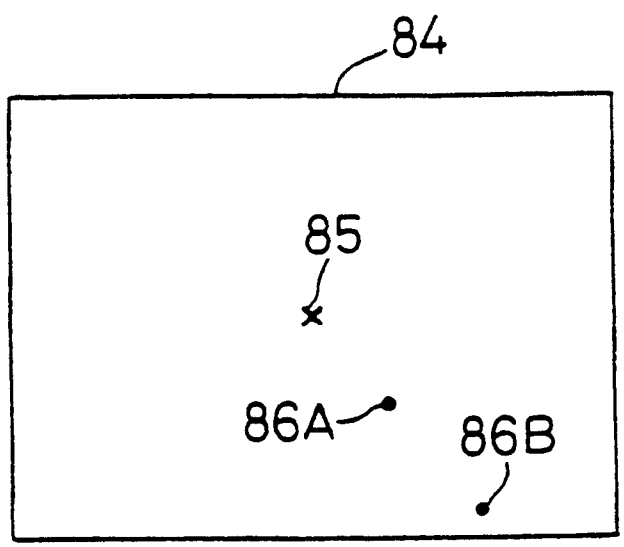

For instance, assume two cases when a point 86A and a point 86B are specified within the scroll area 84 as shown in FIG. 7A. The former point 86A is closer to the reference point 85 than the latter point 86B. When the farther point 86B is specified among the two points, i.e., when the scroll moving quantity is equal and more than the reference moving quantity, the moving quantity is set to calculate a moving quantity of each scroll step by combining all of the above-mentioned three patterns as shown in FIG. 8B. When the point 86A which is closer to the reference point 85 among the two points is specified, i.e., when the scroll moving quantity is less than the reference moving quantity, the starting pattern and the ending pattern are combined at first as shown in FIG. 8C.

Figures 8C, 8D:
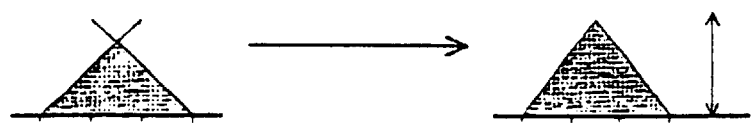
Figure 8B:
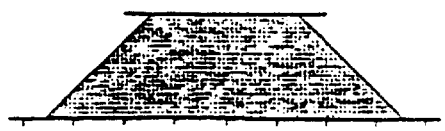

When the starting pattern and the ending pattern overlap as shown in FIG. 8D as a result by combining the starting pattern and the ending pattern, a pattern of moving quantity is set by calculating an acceleration which will eliminate the overlap of the starting pattern and the ending pattern as shown in FIG. 8D.

The operation will be explained below with regard to a second scroll control with reference to FIGS. 7 and 9 through 11. The user may move an image at the position distance from the reference point 85 on the display device 12 by pressing the image in the direction where the image to be moved exists by the pen 15.

The image pressed by the pen 15 scrolls to the position of the reference point 85 via two relay points. FIG. 7B is a graph showing the difference of moving speeds caused by the difference of moving distances. The difference of the moving speeds will be explained by exemplifying two cases when the specified point 86A closer to the reference point and the specified point 86B distant from the reference point are touched, respectively, as shown in FIG. 7A. That is, the images may be scrolled by taking an equal time in these two cases by increasing the acceleration in moving the image when the specified point 86B distant from the reference point is specified more than that when the specified point 86A closer to the reference point is specified as shown in the graph in FIG. 7B in which the horizontal axis represents the time.

When it is detected that the image at the position pressed by the pen 15 has been scrolled to the position of the reference point 85, the central processing unit 32 outputs a signal to cause the buzzer 42 to buzz. When the user keeps to press the pen 15 further, the image at the position pressed by the pen 15 at present is scrolled to the position of the reference point 85 via the two relay points and then the buzzer 42 buzzes. This is repeated until when the pen 15 is separated from the display device 12 or until reaching to the end of the corresponding imaginary image. One time of image scroll from the specified point to the reference point and the output of the buzzer sound are combined as one set and the moving speed is increased in every one set.

The difference of the moving speeds caused by the difference of distances from the reference point 85 will be explained with reference to FIGS. 9A and 9B and FIGS. 10A and 10B, respectively.

FIG. 9A is a diagrammatic view showing a scroll operation when the specified point 86B is fully separated from the reference point. When the user presses one point on the coordinate input device 13 provided over the display screen of the display device 12 by the pen 15, the point on the display screen of the display device 12 right under the pressed point is specified as the specified point 86B in FIG. 9A. When the specified point 86B is specified, the central processing unit 32 calculates a distance between the specified point 86B and the reference point 85.

The central processing unit 32 also scrolls the data display part displayed on the display screen of the display device 12 via two relay points 89 so that the image displayed at the position of the specified point 86B is displayed at the position of the reference point 85.

That is, the image which has been displayed right under the pressed point of the coordinate input device 13 is scrolled step by step so as to be positioned at the center of the display device 12. It is specified such that the moving quantity of one step for scrolling the image is equal to a trisected distance of the distance between the reference point 85 and the specified point 86B.

The second scroll operation is carried out so as to switch the images stepwise for example. The image is scrolled by switching the images so that the image moves from the specified point 86B to the relay point 89a in the first step and is scrolled so that the image moves from the relay point 89a to the relay point 89b in the second step. It is then scrolled from the relay point 89b to the reference point 85 in the third step. Thus, the image which has been displayed at the position of the specified point 86B is displayed at the position of the reference point 85. At this time, the buzzer 42 buzzes.

When the user keeps to press the pen 15 further, the image at the position pressed by the pen 15 at present is scrolled to the position of the reference point 85 via the two relay points and then the buzzer 42 buzzes. This operation is repeated until when the pen 15 is separated from the display device 12 or until reaching to the end of the corresponding imaginary image. The operation until when the buzzer buzzes is set as one set and the moving speed is increased in every one set.

The image is scrolled from the specified point 86B in the direction of the reference point 85 in the second scroll operation. That is, when the user specifies the specified point 86B, the image is scrolled in the direction indicated by a vector 93, i.e., in the left horizontal direction, in the present embodiment.

However, the image may be scrolled not only in the direction of the vector 93 but also in any direction of up and down, right and left and oblique directions. When the upper, lower, right or left edge of the original data is being displayed and when the user issues a command to scroll to the upper, lower, right or left direction, the image may be scrolled only within the extent where the original data exists.

FIG. 9B is a graph showing the relationship between a time and a speed in scrolling the image by continuously touching by the pen 15. The acceleration in the scroll operation is determined in accordance to a moving distance. Because the specified point 86 B is fully separated from the reference point 85, the acceleration is large. The buzzer buzzes at points indicated by arrows indicating ends of the sets.

Assuming a time required for scrolling the image by the first one set is t2 and a speed at the first one set is s2, a moving distance at this time may be represented as "t2×s2". When a time required for scrolling the image by the next one set is t3 and a speed at this time is s3, a moving distance at this time may be represented as "t3×s3". When a time required for scrolling the image by the third one set is t4 and a speed at this time is s4, a moving distance at this time may be represented as "t4×s4".

Then, as shown in FIG. 9B, the time t3 required for scrolling the image by the second one set is shorter than the time t2 required for scrolling the image by the first one set and the time t4 required for scrolling the image by the third one set is shorter than the time t3 required for scrolling the image by the second one set. That is, the time required for moving the image in the equal distance is shortened in every one set by touching the display screen continuously by the pen 15.

The speed s3 in scrolling the image by the second one set is faster than the speed s2 in scrolling by the first one set and the speed s4 in scrolling by the third one set is faster than the speed s3 in scrolling by the second one set, respectively. The speed in the equal distance increases in every one set by touching the display screen continuously by the pen 15.

Because the maximum value of the moving speed is determined, no speed is added further from the fifth set. The buzzer buzzes every time when the move of one set ends.

Figure 10B:
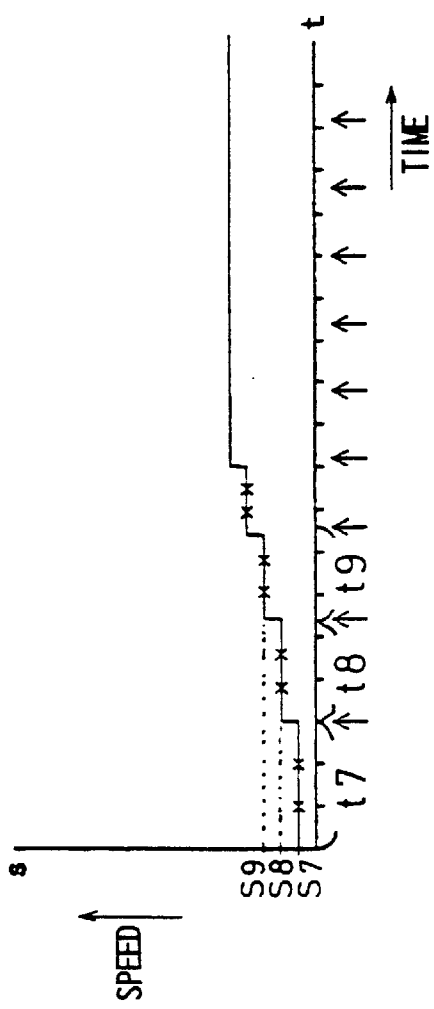
FIGS. 10A and 10B are a diagrammatic view and a graph showing a scroll operation when a specified point is close to the reference point in the second scroll control.
Figure 10A:
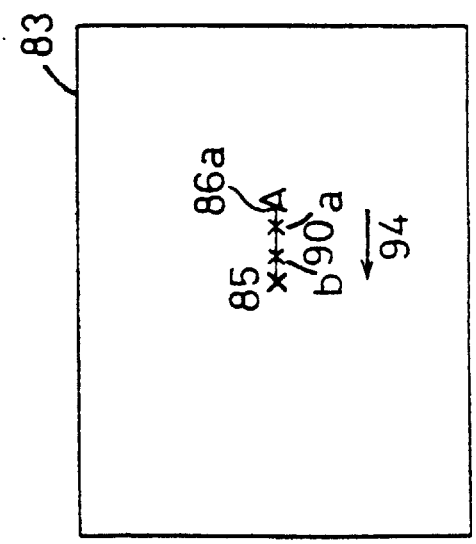

FIG. 10A is a diagrammatic view showing a scroll operation when the specified point 86A is close to the reference point. When the user presses one point on the coordinate input device 13 provided over the display screen of the display device 12 by the pen 15, the point on the display screen of the display device 12 right under the pressed point is specified as the specified point 86A in FIG. 10A. When the specified point 86A is specified, the central processing unit 32 calculates a distance between the specified point 86A and the reference point 85.

The central processing unit 32 also scrolls the data display part displayed on the display screen of the display device 12 via two relay points 90 so that the image displayed at the position of the specified point 86A is displayed at the position of the reference point 85.

That is, the image which has been displayed right under the pressed point of the coordinate input device 13 is scrolled step by step so as to be positioned at the center of the display device 12. It is specified so that the moving quantity of one step for scrolling the image is equal to a trisected distance of the distance between the reference point 85 and the specified point 86A.

The scroll operation of the present embodiment is carried out so as to switch the images step wise for example. The image is scrolled by switching the images; so that the image moves from the specified point 86A to the relay point 90a in the first step and is scrolled so that the image moves from the relay point 90a to the relay point 90b in the second step.

It is then scrolled from the relay point 90b to the reference point 85 in the third step. Thus, the image which has been displayed at the position of the specified point 86A is displayed at the position of the reference point 85. At this time, the buzzer 42 buzzes.

When the user keeps to press the pen 15 further, the image at the position pressed by the pen 15 at present is scrolled to the position of the reference point 85 via the two relay points and then the buzzer 42 buzzes. This operation is repeated until when the pen 15 is separated from the display device 12 or until reaching to the end of the corresponding imaginary image. The operation until when the buzzer buzzes is set as one set and the moving speed is increased in every one set.

The image is scrolled from the specified point 86A in the direction of the reference point 85 in the scroll operation of the present embodiment. That is, when the user specifies the specified point 86A, the image is scrolled in the direction indicated by a vector 94, i.e., in the left horizontal direction, in the present embodiment. The image may be scrolled not only in the direction of the vector 94 but also in any direction of up and down, right and left and oblique directions. When the upper, lower, right or left edge of the original data is being displayed and when the user issues a command to scroll to the upper, lower, right or left direction, the image may be scrolled only within the extent where the original data exists.

FIG. 10B is a graph showing the relationship between a time and a speed in scrolling the image by continuously touching by the pen 15. The acceleration in the scroll operation is determined in accordance to a moving distance. Because the specified point 86 A is close to the reference point 85, the acceleration is small. The buzzer buzzes at points indicated by arrows indicating ends of the sets.

Assuming a time required for scrolling the image by the first one set is t7 and a speed at the first one set is s7, a moving distance at this time may be represented as "t7×s7". When a time required for scrolling by the next one set is t8 and a speed at this time is s8, a moving distance at this time may be represented as "t8×s8". When a time required for scrolling by the third one set is t9 and a speed at this time is s9, a moving distance at this time may be represented as "t9×s9".

Then, as shown in the figure, the time t8 required for scrolling the image by the second one set is shorter than the time t7 required for scrolling by the first one set and the time t9 required for scrolling by the third one set is shorter than the time t8 required for scrolling by the second one set. That is, the time required for moving the image in the equal distance is shortened in every one set by touching the display screen continuously by the pen 15.

The speed s8 in scrolling the image by the second one set is faster than the speed s7 in scrolling by the first one set and the speed s9 in scrolling by the third one set is faster than the speed s8 in scrolling by the second one set, respectively. The speed in the equal distance increases in every one set.

Because the maximum value of the moving speed is determined, no speed is added further from the fifth set. The buzzer buzzes every time when the move of one set ends.

It is then apparent by comparing FIGS. 9B and 10B described above that the difference between the moving speeds of two consecutive steps in scrolling the image of the case when the point 86B which is distant from the reference point 85 is specified, i.e., the case of FIG. 9B, is greater than the difference between the moving speeds of two consecutive steps in scrolling the image of the case when the point 86A which is closer to the reference point 85 is specified, i.e., the case of FIG. 10B. That is, the increment of the moving speed, i.e., the acceleration, is greater in the latter than that of the former.

Figure 11:
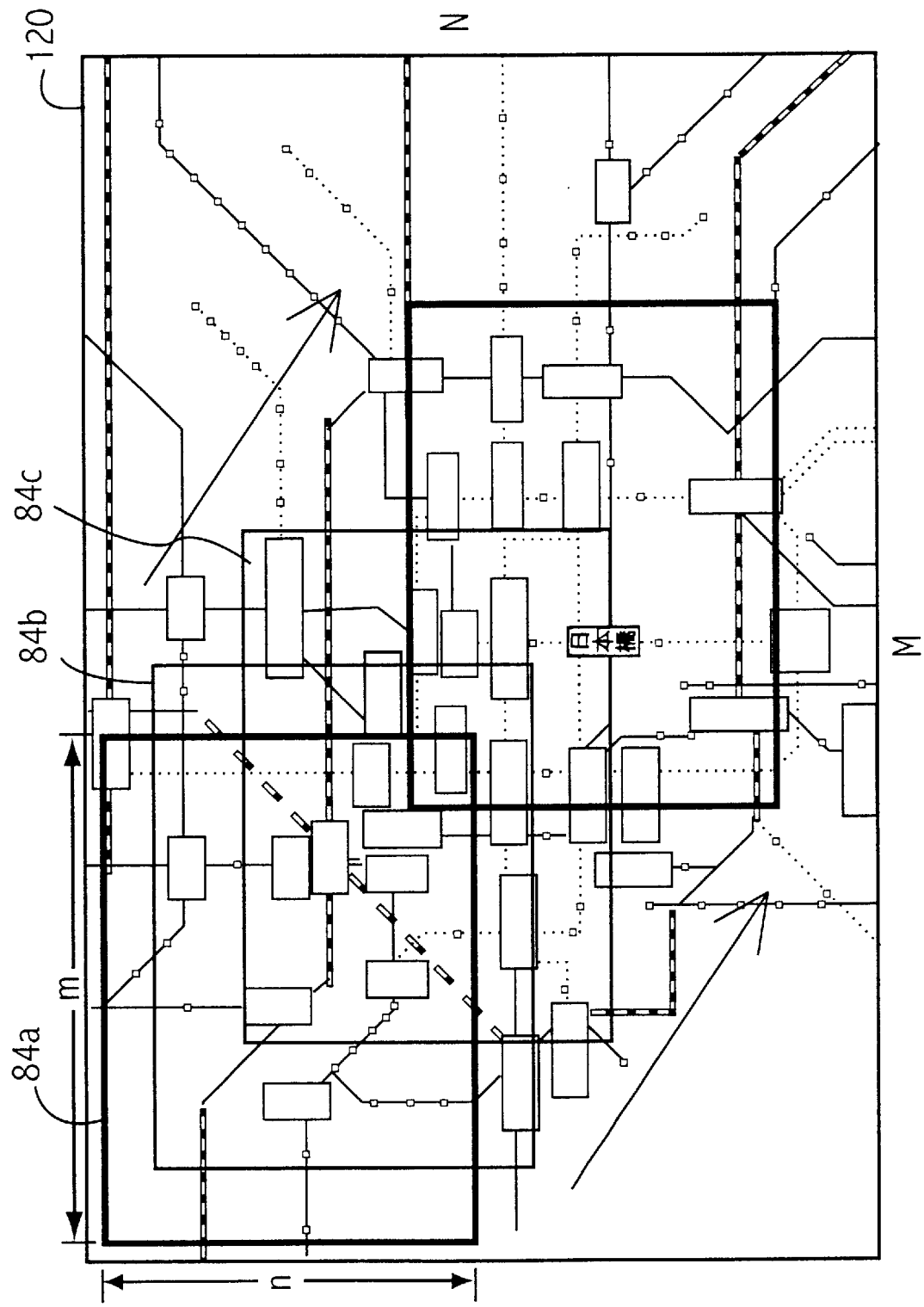
FIG. 11 is a diagram showing the relationship between an imaginary image and data display parts.

FIG. 11 is a diagram showing the relationship between an imaginary image 120 into which the data stored in the data section 51 is all imaged and the scroll area 84 on the display screen of the display device 12. Assume here that the data stored in the data section 51 is image data representing a route map.

The above-mentioned scroll area 84 has a size capable of disposing an image of m dots in the X direction, i.e., in the horizontal direction, and n dots in the Y direction, i.e., in the vertical direction, in a matrix while leaving a predetermined gap between adjacent images per each image. That is, it can display each image in a matrix of (n×m).

The imaginary image 120 displays each image in a matrix of (N×M). An image of data which can be displayed in the scroll area 84 is equivalent to what a part of the imaginary image 120 is cut out. Regions 84a through 84d represent data portions within the imaginary image 120 which are displayed in the scroll area 84.

That is, when the region 84a is displayed in the scroll area 84 at first, it means that the region 84a of the imaginary image 120 is cut out and is displayed on the display device 12. When the user instructs to scroll the image in the lower right direction at this time, the region to be cut out of the imaginary image 120 is changed by a number of moved dots, thus cutting out and displaying the region 84b on the display device 12. The data part to be displayed in the scroll area 84 may be any part other than that region.

The first and second scroll control operations described above will be explained below with reference to a flowchart in FIG. 12.

At first, the user displays information to which the user wishes to make reference on the display device 12 in STEP 1. In STEP 2, the process is held until when coordinates are inputted to the coordinate input device 13 by the pen 15.

When coordinates are inputted, it is discriminated whether or not the inputted coordinates exist in the scroll area 84 in STEP 3. When the coordinates have been inputted to the outside of the scroll area 84, a process corresponding to the other inputted position is implemented. When the coordinate has been inputted in the scroll area 84, the inputted coordinates are taken in and are stored in the data section 51 of the memory 44 in STEP 4.

Then, a distance thereof from the center of the scroll area 84 in the X-axis direction is calculated in STEP 5 by comparing a value on the X-axis of the center coordinate of the scroll area 84 stored in advance and a value on the X-axis of the inputted coordinates taken in STEP 4.

A distance thereof from the center of the scroll area 84 in the Y-axis direction is calculated in STEP 6 by comparing a value on the Y-axis of the center coordinate of the scroll area 84 stored in advance and a value on the Y-axis of the inputted coordinates taken in STEP 4.

It is then discriminated whether or not the user is continuously touching the coordinate input device 13 by the pen 15 in STEP 7. When the user is not continuously touching the coordinate input device 13 by the pen 15, it is discriminated whether or not an image exists at the destination of the scroll within the imaginary image 120 as information to be moved in STEP 8. When there is no information to be moved, a quantity which can be moved from the position of the region presently cut out of the imaginary image 120 is set in STEP 9.

It is then discriminated whether or not the moving quantity is longer than the starting and ending patterns shown in FIG. 8 in STEP 10. When the moving quantity is shorter than the starting and ending patterns shown in FIG. 8, a speed pattern is calculated from the starting and ending patterns in STEP 11. When the moving quantity is longer than the starting and ending patterns shown in FIG. 8, a speed pattern is calculated from the starting, intermediate and ending patterns in STEP 12. Then, the information displayed on the display device 12 is scrolled by using the calculated speed pattern in STEP 13.

When the user is continuously touching the coordinate input device 13 by the pen 15 as a result of discrimination in STEP 7, an acceleration A is set in STEP 14 in accordance to the distance from the reference point 85 obtained from the distances on the X- and Y-axes obtained in STEPs 5 and 6.

In STEP 15, the acceleration A set in STEP 14 is added to an acceleration B which is an initial value of an acceleration to set a new initial value B and the scroll quantity is set in accordance to the acceleration B. In STEP 16, it is discriminated whether or not there exists an image at the destination of the scroll within the imaginary image 120 as information to be moved. When there is no information to be moved, a quantity which can be moved from the position of the region presently cut out of the imaginary image 120 is set in STEP 17.

In STEP 18, the information displayed on the display device 12 is scrolled by the quantity set in STEP 15 or in STEP 17. Then, it is discriminated whether or not one set of scroll has been completed in STEP 19.

When one set of scroll has not been completed, the process returns to STEP 16 and the processes from STEP 16 to STEP 19 are repeated until when one set of scroll is completed. When one set of scroll has been completed, the buzzer 42 clicks in STEP 20. Then, it is discriminated whether or not the user is continuously touching the coordinate input device 13 by the pen 15 in STEP 21. When the user is not continuously touching the coordinate input device 13 by the pen 15, the process ends.

When the user is continuously touching the coordinate input device 13 by the pen 15, the process returns to STEP 15 and the processes from STEP 15 to STEP 21 are repeated until when the user separates the pen 15 from the display device 12. It is noted that a maximum value is set for the value of the acceleration B in STEP 15 in accordance to the value of the acceleration A, so that the value of B will not exceed that value. The scroll operation has been explained above with reference to the flowchart.

It is noted that the variation of the scroll quantity has been explained by exemplifying the distances for moving images in a fixed time in the present embodiment, times for moving images in a fixed quantity may be used as the variation of the scroll quantity. Further, the present embodiment has been explained by using the pen as the coordinate inputting device, other pointing devices such as a mouse may be used.

An image may be scrolled in an arbitrary direction by the above-mentioned processes in the electronic apparatus 11 by touching the coordinate input device 13 by the pen 15 and by separating it right away and the scroll operation may be started and ended with different scroll quantities from that in the other time of the scroll. Further, when the user continuously touches the coordinate input device 13 by the pen 15 and when an image at the specified coordinate is scrolled to the fixed coordinate position, the electronic apparatus 11 can inform of that and repeat the scroll operation and the informing process until when the pen 15 is separated from the coordinate input device 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A scroll controller comprising:
   a storage device for storing image information;
   a display device for displaying the image information stored in the storage device;
   a position specifying device for specifying a coordinate position of the image information displayed on the display device;
   a calculating device for calculating a difference between prefixed coordinates and the coordinate position specified by the position specifying device;
   a scroll quantity setting device for setting a scroll acceleration on the basis of a calculation result of the calculating device;
   a scroll control device for scrolling the image information at least on the basis of the acceleration set by the scroll quantity setting device; and
   wherein between a starting point and an end of reference point, the acceleration is set in the vicinity of the starting point, and deceleration is set in the vicinity of the end or reference point.

2. The scroll controller of claim 1, wherein the scroll quantity setting device sets scrolling quantities so that a scroll starts and ends with different scrolling quantities from that of other time of the scroll.

3. The scroll controller of claim 1, wherein, when a plurality of scroll operations by the scroll control device are carried out consecutively, the scroll quantity setting device increments a scroll quantity per unit time operation by operation.

4. The controller of claim 1, wherein scrolling speed changes during said scrolling as a function of the calculation result of said calculating device.

5. A scroll controller comprising:
   a storage device for storing image information;
   a display device for displaying the image information stored in the storage device;
   a position specifying device for specifying a coordinate position of image information displayed on the display device;
   a calculating device for calculating a difference between prefixed coordinates and the coordinate position specified by the position specifying device;
   a scrolling device for scrolling the image information at the specified coordinate position to a prefixed coordinate position utilizing an acceleration based at least on the calculation result of the calculating device, so that different accelerations are utilized for coordinate positions specified at different distances from the prefixed coordinates; and
   a notifying device for notifying at a point in time when an image portion at the specified coordinate position is scrolled to the prefixed coordinate position by the scrolling device.

6. The controller of claim 5, wherein said scrolling device scrolls the image information at the specified coordinate position to the prefixed coordinate position via at least first, second, and third intermediate locations so that scrolling speed of the image information at the specified coordinate position changes during said scrolling of the image information at the specified coordinate position to the prefixed coordinate position as a function of a distance from the specified coordinate position to the prefixed coordinate position.

7. The controller of claim 5, wherein scrolling speed changes during said scrolling as a function of the calculation result of the calculating device.

8. A method of scrolling comprising the steps of:
   providing a storage device for storing image information, displaying at least a portion of the image information on a display device;
   specifying a coordinate position of a portion of the image information displayed on the display device;
   calculating a different in location between a predetermined coordinate position and the specified coordinate position;
   scrolling image information corresponding to the specified coordinate position to another position on the display device, and calculating speed of said scrolling based upon the difference in location determined in said calculating step; and
   wherein between a starting point and an end or reference point the acceleration is set in the vicinity of the starting point and deceleration is set in the vicinity of the end or reference point.

9. The method of claim 8, wherein said scrolling step further comprises scrolling the image information corresponding to the specified coordinate position to the another position on the display device via a plurality of intermediate locations positioned between said specified coordinate position and said another position, and wherein first and second of the intermediate locations are spaced closer together than second and third of said intermediate locations so that scrolling speed increases during at least a portion of said scrolling.

10. A scroll control system comprising:
    a storage device for storing an image;
    a display for displaying only a portion of the image stored in said storage device;
    a position specifying device for specifying a coordinate position of a first portion of the image pointed to on the display;
    wherein said position specifying device points to the coordinate position on the display when it is desired to scroll the first portion of the image corresponding to said coordinate position to another location on the display;
    a calculating device for calculating a difference between reference point coordinates on the display and the coordinate position of the first portion of the image pointed to by the position specifying device;
    a scroll quantity setting device for setting a scroll acceleration value on the basis of a calculation result of the calculating device, so that the acceleration value is based upon a difference between said reference point coordinates and said coordinate position of the image pointed to by said position specifying device; and
    a scroll control device for scrolling the first portion of the image corresponding to the coordinate position pointed to on the display to said another location on the display using the acceleration value set by the scroll quantity setting device.

* * * * *